US010438157B2

(12) United States Patent
Heier (10) Patent No.: US 10,438,157 B2
(45) Date of Patent: Oct. 8, 2019

(54) SYSTEM AND METHOD OF CUSTOMER INTERACTION MONITORING

(71) Applicant: Verint Americas Inc., Alpharetta, GA (US)

(72) Inventor: Kurt Heier, Westminster, CO (US)

(73) Assignee: Verint Americas Inc., Alpharetta, GA (US)

( * ) Notice: Subject to any disclaimer, the term of this patent is extended or adjusted under 35 U.S.C. 154(b) by 450 days.

(21) Appl. No.: 14/263,411

(22) Filed: Apr. 28, 2014

(65) Prior Publication Data

US 2015/0006263 A1 Jan. 1, 2015

Related U.S. Application Data

(60) Provisional application No. 61/839,505, filed on Jun. 26, 2013.

(51) Int. Cl.
*G06Q 10/06* (2012.01)

(52) U.S. Cl.
CPC .............................. *G06Q 10/06398* (2013.01)

(58) Field of Classification Search
CPC .............................................. G06Q 10/06398
See application file for complete search history.

(56) References Cited

U.S. PATENT DOCUMENTS

| 8,380,558 | B1* | 2/2013 | Sharma | G06Q 30/02 348/69 |
| 9,088,808 | B1* | 7/2015 | He | H04N 21/251 |
| 9,760,631 | B1* | 9/2017 | Broxton | G06Q 30/00 |
| 2007/0043608 | A1* | 2/2007 | May | G06Q 10/0633 705/7.27 |
| 2008/0018738 | A1* | 1/2008 | Lipton | G06K 9/00771 348/143 |
| 2008/0218591 | A1* | 9/2008 | Heier | G06Q 20/20 348/150 |
| 2012/0130774 | A1* | 5/2012 | Ziv | G06Q 10/06393 705/7.39 |
| 2013/0294646 | A1* | 11/2013 | Shaw | G06K 9/00771 382/103 |
| 2014/0358612 | A1* | 12/2014 | Sri | G06Q 30/016 705/7.15 |

* cited by examiner

*Primary Examiner* — Sujay Koneru
(74) *Attorney, Agent, or Firm* — Christopher M. Scherer; DeWitt LLP (57) ABSTRACT

A method of monitoring customer service interactions includes the acquisition of video data. The video data is analyzed to track a location of a customer and to track a location of an agent. An interaction between the customer and the agent is identified based upon an intersection of the respective tracked locations of the customer and the agent and a dwell time of the customer and agent at the intersection.

12 Claims, 3 Drawing Sheets

SYSTEM AND METHOD OF CUSTOMER INTERACTION MONITORING

CROSS-REFERENCE TO RELATED APPLICATION

The present application claims priority of U.S. Provisional Patent Application No. 61/839,505, filed on Jun. 26, 2013, the content of which is hereby incorporated herein by reference in its entirety.

BACKGROUND

The present disclosure relates to systems and methods for identification of interactions between customers and customer service agents within a retail facility and data driven solutions for the evaluation and optimization of the deployment of customer service efforts within the retail facility.

In a retail store setting, customer interactions with customer service agents can improve the customer experience and facilitate increased sales. Current methods of customer service agent deployment within a retail facility is generally based upon management experience and generalized impressions of customer flow and customer-agent interactions within various sales departments. Therefore, these determinations are highly subjective which can result in great inefficiencies in the deployment and management of customer service agents across sales departments in a retail facility. Similarly, the effectiveness of customer-agent interactions are also only anecdotally and subjectively monitored, which can result in unreliable or difficult to evaluate information upon which manager makes customer service decisions.

BRIEF DISCLOSURE

An exemplary embodiment of a method of monitoring customer service interactions includes acquiring video data of a facility. The video data is analyzed to track a location of a customer in the facility. The video data is analyzed to track a location of an agent in the facility. An interaction between the customer and the agent is identified based upon an intersection of the respective tracked locations of the customer and the agent and a dwell time of the customer and the agent at the intersection.

An additional exemplary embodiment of a method of monitoring customer service interactions includes acquiring video data with a plurality of cameras. An interaction computer analyzes the video data to identify locations of a customer. The interaction computer analyzes the video data to track a location of at least one agent. The customer is tracked through a plurality of identified locations to a checkout. At least one interaction between the customer and the at latest one agent is identified based upon an intersection of the identified locations of the customer and the tracked location of the at least one agent and a dwell time of the customer and the at least one agent at the intersection. The customer is associated with point-of-sale data. An evaluation of the identified at least one interaction is produced based upon the point-of-sale data.

An exemplary embodiment of a non-transient computer readable medium programmed with computer readable code for the monitoring of customer service interactions upon execution by a computer processor causes the computer processor to acquire video data. The video data is analyzed to identify locations of a customer. The video data is analyzed to track a location of at least one agent. The customer is tracked through a plurality of identified locations to a checkout. At least one interaction between the customer and at least one agent is identified based upon an intersection of the identified locations of the customer and a tracked location of the at least one agent and a dwell time of the customer and the at least one agent at the intersection. At least one product associated with the intersection is identified. The customer is associated with point-of-sale data. The identified at lea tone interaction is evaluated based upon the point-of-sale data and the at least one product.

DETAILED DISCLOSURE

Figure 1:
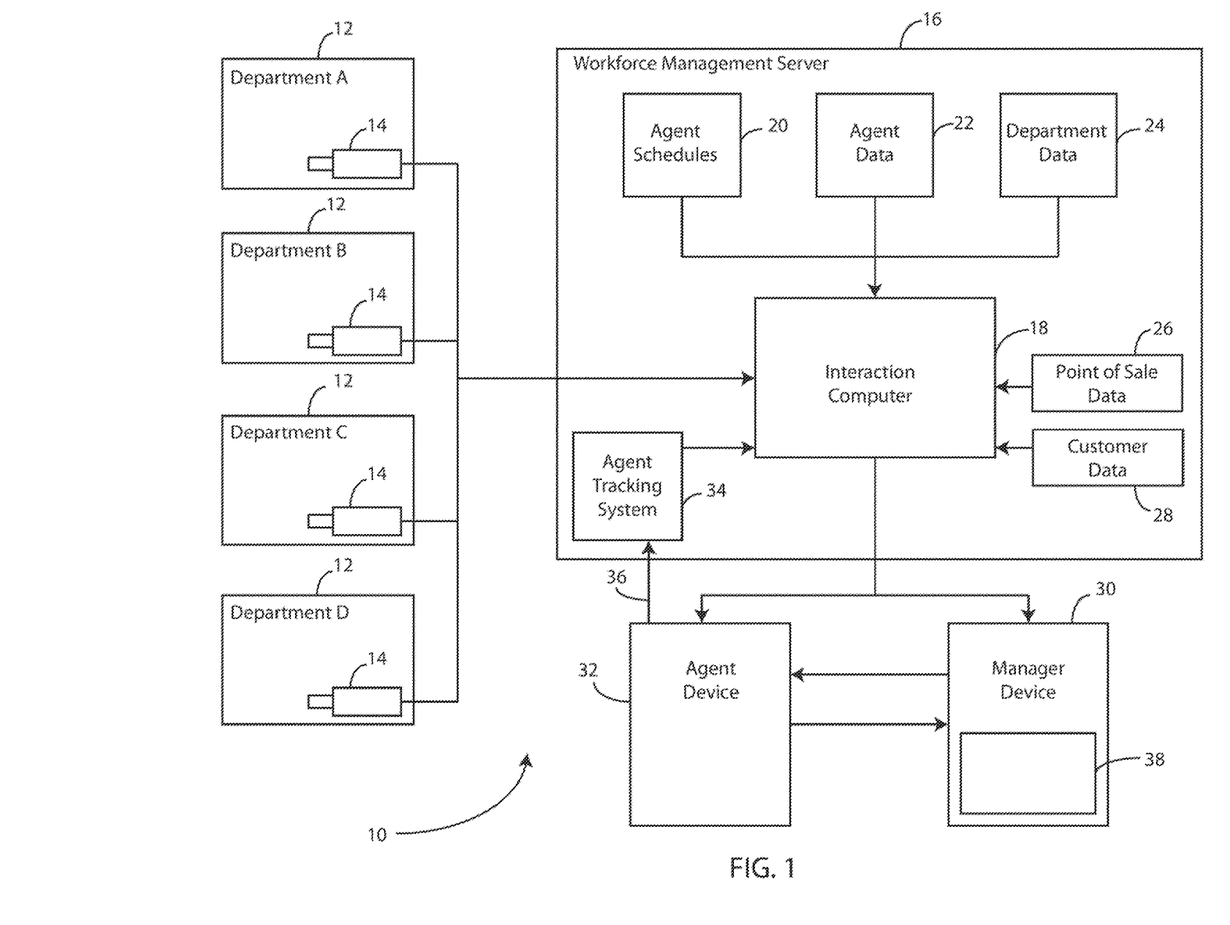
FIG. 1 is a system diagram of an exemplary embodiment of a system for customer interaction monitoring.

FIG. 1 depicts an exemplary embodiment of a system 10 for customer interaction monitoring as disclosed herein. A customer interaction monitoring system 10 is exemplarily configured to monitor interactions between customers and customer service agents in a facility, exemplarily a retail store facility, with a plurality of departments 12, exemplarily identified as "Department A", "Department B", "Department C", and "Department D." In a merely exemplary embodiment, the departments 12 may include departments such as clothing, home goods, shoes, or jewelry in a department store, while departments such as lawn and garden, paint, tools, and building materials may be found in a home improvement store. It will be recognized that these are merely exemplary retail store facilities and that embodiments of the customer interaction monitoring systems and methods as disclosed herein may be used or have application in any of a variety of retail or other customer service facilities or settings. Each department 12 is outfitted with one or more video cameras 14 that operate as disclosed herein to obtain video data of the department 12 from which real time or near real time determinations of people counts within the department may be made. The people counts may be further refined as disclosed herein to distinguish agents, exemplarily customer service agents, from customers. In embodiments, and as disclosed in further detail herein, the people counts may be achieved by processing the video data with image processing and pattern matching techniques to identify individual people in the video data.

The video data is provided from the video cameras 14 to a workforce management server 16 and exemplarily to an interaction computer 18 operating on or in conjunction with the workforce management server 16. In an embodiment, the interaction computer 18 processes the video data to determine the people counts from the video data, including the identification of customers and agents. In an alternative embodiment, a separate computer or computer program operating on a computer (not depicted) receives the video data, processes the video data to identify people within the video data, and categorizes the identified people as either customers or customer service agents. In further embodiments, the video data can be analyzed to track individual customers or individual agents in movements both within a department and across departments.

In still further embodiments, agents may each have an electronic device 32 associated with the agent, which exemplarily may be a mobile computing device, exemplarily a smart phone or in an additional embodiment, an RFID tag. The electronic device 32 is tracked by an agent tracking system 34 to provide further agent data 36. The agent data 36 may provide identification of a particular agent, or may be tracked or otherwise triangulated by the agent tracking system 34 in order to identify the location of the identified agent. In a still further embodiment, the electronic device 32 comprises a GPS system, and the agent data 36 includes the identified GPS coordinates of the current location of the electronic device 32. The agent data 36 is analyzed along with the video data in order to confirm and refine the identification of agents within the video data and the locations of agents in the department or facility. In an embodiment, the video data of specific locations in the video data are registered to the agent data used by the agent tracking system, whether the agent data is a GPS location, a relation to a Wi-Fi or cellular antenna, or another form of agent data indicative of the agent's location. In embodiments, the verification of the locations of particular agents in the video data may enable identification and/or tracking of specific agents within the video data. In alternative embodiments, specific agents may be identified and/or tracked in the video data by recognition of agent physical features or distinctive clothing or uniform features that can be identified in the video data. These physical, clothing, or uniform features may be identified in the video data by the interaction computer. In a non-limiting embodiment, agents may be tracked and/or identified based upon an agent schedule, agent training, or other agent data as described in further detail herein.

The workforce management server 16 includes a variety of sources of data that is provided to, and used by, the interaction computer 18 as described in further detail herein. The workforce management server 16 includes agent schedules 20, agent data 22, and department data 24. In embodiments, the agent schedules 20, agent data 22, and department data 24 are stored in databases on computer readable media. In embodiments, these may be individual databases on individual computer readable media, or may be integrated into a single database and computer readable media. Similarly, while depicted as part of the workforce management server 16, agent schedules 20, agent data 22, and department data 24 may be remotely located and stored on a computer readable medium apart from the workforce management server 16, but communicatively connected thereto. The agent schedules 20 may include start, stop, and break times for individual agents, as well as a particular task to which the agent is assigned during the scheduled times. Non-limiting examples of assigned agent tasks, may include assignment of an agent to a particular department, assignment to a floating position between two or more departments, or assignment to a particular task, such as, but not limited to, product restocking or product re-facings. However, these are merely exemplary embodiments of jobs to which the agent may be assigned.

The agent data may include agent identification information, such that the agent data may be cross referenced and/or associated with an agent schedule and/or an agent identification or location obtained from the agent tracking system 34 as described above. The agent data 22 may further include an identification of the departments in which the agent has expertise, which may be identified as "primary" departments, and an identification of departments in which the agent has received at least basic knowledge or training, which may be identified as "secondary" departments.

The department data 24 may include the identification of each of the departments, an expertise used in that department, a predetermined target customer-to-agent ratio for the department, a boundary of the department and a geographic proximity to the other departments within the facility. In an embodiment, the department data 24 may further include data regarding each of the products in the department, and a location of each of the products in the department. Such data may include product SKU's or other product identification numbers or codes.

The interaction computer 18 may further receive additional sources of data stored on or in relation to the workforce management server 16. This additional data includes point-of-sale data 26 which exemplarily includes: receipts or other check out data that identifies product purchased, purchase price, total purchase amount, associations between products purchased in a single transaction, payment method, or other information regarding sales transactions in the retail store facility. The point-of-sale data 26 may be stored in a database on a computer readable medium integrated with or communicatively connected to the workforce management server 16. Additionally, the interaction computer 18 may receive customer data 28 which may include, but is not limited to stored historical tracked customer locations, customer interactions, and point-of-sale data associated with individual customer visits. In further embodiments as disclosed herein, the interaction computer 18 may store or acquire customer data 28 including, tracked customer locations, customer-agent interactions, and customer point-of-sale data.

The interaction computer receives the agent schedules 20, agent data 22, department data 24, point-of-sale data 26, and/or customer data 28 as described in further detail herein and processes such data in the exemplary manners as disclosed herein in order to produce evaluations of the effectiveness of either specific customer-agent interactions or aggregate analysis of the overall effectiveness of a plurality of customer-agent interactions, as will be described in further detail herein.

The interaction computer 18 is communicatively connected to a computing device 30 associated with a manager. The interaction computer operates to provide the determined evaluation of customer-agent interaction effectiveness to the computer device 30. In embodiments, the interaction computer 18 may operate to provide or push the determined evaluations to the computing device 30 while in other embodiments, the computing device 30 is operable to access the evaluations determined by the interaction computer 18 and exemplarily stored at the workforce management server 16. In such embodiments computing device 30 operates to visually present the evaluations determined by the interaction computer 18. In alternative embodiments, the interaction computer 18 may be associated with and operate a graphical display (not depicted) upon which the evaluations determined by the interaction computer 18 may be visually presented. It is to be recognized that in embodiments, the interaction computer 18 may be communicatively connected to a plurality of computing devices 30 that may be associated with a plurality of managers, but for the object of conciseness in the description of this exemplary embodiment, a single computing device 30 associated with a manger will be described. In an embodiment, the computing device 30 associated with the manager may be a smart phone or other hand held computing device, while in other embodiments the computing device 30 may be a desktop, laptop, or tablet computer. Additionally, the system 10 may further include computing devices 32 associated with each of the customer service agents, which may exemplarily provide agent data 36 as described above to the agent tracking system 34. In still further embodiments, the computing device 32 associated with the customer service agent is communicatively connected to the computing device 30 associated with the manager author the workforce management server 16, such as to facilitate communication between a manager and one or more customer service agents. In an exemplary embodiment, the one or more agent computing devices 32 are communicatively connected to the one or more manager computing devices 30 by way of cellular, RF, IR, or other known communication platforms.

Figure 2:
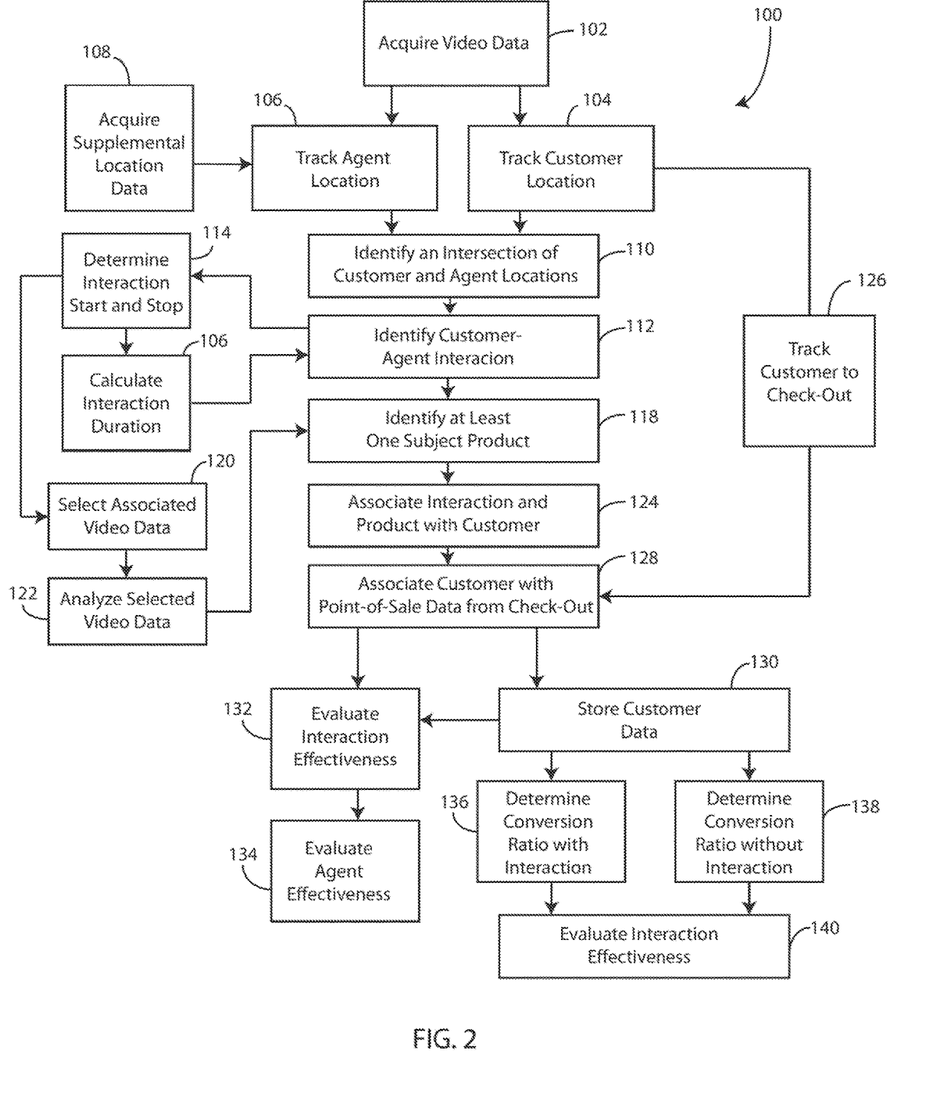
FIG. 2 is a flow chart that depicts an exemplary embodiment of a method of customer interaction monitoring.

FIG. 2 is a flow chart that depicts an exemplary embodiment of a method of customer interaction monitoring 100. The method 100 begins at 102 with the acquisition of video data from a plurality of video cameras distributed throughout a facility, exemplarily a retail store. In an embodiment, the video data is acquired with respect to a plurality of departments or regions defined within the facility. The video data can be acquired and streamed in real time for real time or near-real time processing embodiments in a manner as disclosed herein. In other embodiments, the video data may be recorded in a digital format for later processing and analysis which includes the techniques and analysis features as described herein.

At 104 the location of individual customers is identified and tracked. In carrying out such functionality, the video data acquired at 102 is analyzed to identify people within the video data. Such identification of people in the video data may be performed by using image processing and/or pattern matching techniques and algorithms. Sequential identification of the same person in a series of frames of video data enables the location of that person in the video data to be tracked. The identified people in the video data may then be distinguished between agents and customers. As previously described, agents and customers may be exemplarily distinguished by identifying rotatable articles of clothing, such as a distinctive hat or shirt color associated with an agent, or agent location data may be used in association with the video data to identify customer service agents in the video data. In still further embodiments, agents may be identified based upon a path or amount of time spent in a particular department of field of view of specific video data. At 104 the customer's locations in the acquired video data are tracked such as to determine the location of the customer over time within the retail store facility.

At 106, the locations of each of the customer service agents working at the retail store facility are identified and tracked such that the location of individual customer service agents over time is known. The tracking of the agent locations at 106 may be facilitated by the acquisition of supplemental location data at 108. The supplemental location data may be acquired using an agent tracking system which works in conjunction with a computing device associated with each customer service agent. Supplemental location data may be acquired from an electronic device associated with each of the customer service agents. In non-limiting embodiments, the electronic device may be an RPM tag or may be a mobile computing device such as a smart phone that transmits a wireless signal, while in still further embodiments the supplemental location data may be provided from a GPS enabled device that transmits the current GPS coordinates of that device. The acquired supplemental location data 108 may further include an identification of the specific customer service agent to which the location data is associated. Thus, the supplemental location data acquired at 108 can facilitate and refine the tracking of individual agents in the acquired video data, by confirming and refining the identification of individual agents based upon video analysis techniques. In embodiments, the video data may be registered to location data as obtained by the agent tracking system or from the agent device directly. Registration of particular locations may further facilitate coordination of the agent location data in refining the identification and tracking of customer service agents in the video data.

Once individual agent locations have been identified and are tracked over time at 106 and the individual customer locations are identified and tracked over time at 104, an intersection of a customer location and an agent location at a particular point in time can be identified at 110. An identification of such an intersection can be defined as either an overlap of the tracked locations of the individual customer and individual agent or can alternatively be defined as a predetermined proximity between concurrent locations of individual customers and individual agents, for an example, when an individual customer and an individual agent are concurrently determined to be within exemplarily five feet, ten feet, or some other proximity range.

Next, at 112 those customer and agent location intersections that result in a customer-agent interaction are identified. Customer-agent interactions can be identified in a variety of ways, including through video analysis of the video data acquired at 102, which may include identification of an interaction between the customer and the agent. In one embodiment, at 114 the start and stop time of a potential interaction are determined. Exemplarily, this determination is made by identifying the time when the individual customer and individual agent enter into the predetermined intersection proximity with one another, and the time is marked when the individual customer and individual agent leave the predefined intersection proximity with one another. This determination is used at 116 to calculate an interaction duration, which may be compared to a predetermined interaction threshold in order to identify if a customer-agent interaction occurred at 112. In a merely exemplary embodiment, a predetermined interaction duration threshold of one minute is used to distinguish customer-agent interactions, from coincidental proximity between a customer and a customer service agent. It is to be recognized that the predetermined interaction duration threshold of one minute is merely exemplary and other shorter or longer durations may be used or are suitable depending upon the specific implementation of the embodiment disclosed herein. In a further embodiment, the video data associated with the potential interaction is analyzed further to identify if a customer-agent interaction occurred. Such video data analysis may identify if the customer and agent face each other or orient themselves in a similar direction while in the proximity of one another.

At 118 at least one subject product is identified for the identified customer-agent interaction. The identification of at least one subject product may be performed in a variety of ways. In one embodiment, department data or product data can be used in order to identify those products in direct proximity to the location of the customer-agent interaction. The identified at least one subject product may be as specific as an individual product or SKU number, while in other embodiments, the identified at least one subject product may be a generalized product identification, exemplarily paint or bathroom fixtures or hand tools. In embodiment, analysis of the video data may be able to identify particular items, if such items are large and/or distinctive (e.g. a lawn mower or a grill). In other embodiments, a point of sale display associated within the location of the identified interaction may only include a small number of related products.

In one exemplary embodiment, the interaction start and stop times determined at 114 may be further used at 120 in order to select associated video data of the identified customer-agent interaction from the video data acquired at 102. The associated video data selected at 120 may be more rigorously or intensively analyzed such as to identify the at least one subject product at 118 or to identify a product selected by the customer during the course of the customer-agent interaction. In a still further embodiment, the analysis of the selected video data may be used to further refine the specific location of the at least one subject product, which may be cross referenced with the product or department data in order to identify the subject product. In a non-limiting embodiment, video data analysis may identify a particular shelf or location on a shelf for which the product was selected. This may be cross-referenced with product location data from the department data to identify the selected product.

At 124 the customer-agent interaction and the at least one subject product is associated with the customer, exemplarily in the customer data stored at the workforce management server. This associated interaction product and customer identification can be used in the manners and processes as described in further detail herein in order to evaluate the customer interactions.

At 126 the customer locations tracked at 104 are continued throughout the customer's visit to the retail store facility from entrance until checkout. In an embodiment, a series of customer locations may be stored in a database at periodic intervals to record the customer's movement through the retail store facility. Periods of customer-agent interactions may be similarly recorded with an identification of the agent with whom the customer interacted. Thus, over the course of a single customer visit, the individual customer may experience one or more customer-agent interactions with various individual customer service agents while shopping in various departments of the retail store facility. Additionally, by tracking the customer location throughout the retail store facility, information regarding those locations where the customer traveled, but did not experience a customer-agent interaction, can also be identified. Finally, by tracking the customer location over the course of the visit through to the customer checkout, the individual customer can then be associated with point-of-sale data from the checkout at 128. The point-of-sale data acquired for the checkout may identify all of the products purchased by the customer in that visit, the prices paid for those products, and/or the payment method for those products.

At 130 all of the data pertaining to the individual customer visit can be stored as customer data, exemplarily on a computer readable medium of the workforce management server. This customer data can include identification of each of the customer-agent interactions experienced by the customer, the tracked customer location throughout the retail store facility, the identified at least one subject product of each of the customer-agent interactions, and the point-of-sale data identifying all of the products purchased by the customer during the visit. The customer data from each customer visit can be stored in a database of historical customer data from a plurality of these customer visits and data used in the aggregate in order to identify averages or characteristics regarding customer-agent interactions, specific products that are the subject of customer-agent interactions, and information regarding sales associated with products that are the subject of customer-agent interactions.

The customer data stored at 130 can be used at 132 in connection with the individual customer-agent interaction and point-of-sale data of an individual customer visit in order to evaluate the effectiveness of the customer-agent interaction identified at 112. The evaluation at 132 of the effectiveness of an individual customer-agent interaction may identify whether or not a purchase was made of the at least one subject product, otherwise known as a conversion, or if the product purchased by the individual customer is a product that has a higher sales price or profit margin compared to average sales of similar products to the at least one subject product. This can provide an evaluation as to whether the customer-agent interactions are resulting in increased sales or the direction of customers to ore expensive or higher margin products. In an exemplary embodiment, these determined evaluations of customer-agent interaction may be stored in a database on a computer readable medium associated with the workforce management server.

At 134 by associating each of the evaluations of the effectiveness of individual customer-agent interactions from 132 to a particular agent involved in the customer-agent interaction, the effectiveness of individual customer service agents can be evaluated at 134 when taken across a plurality of evaluated customer-agent interactions. This evaluation of customer service agent effectiveness at 134 can be stored at a computer readable medium associated with the workforce management server and used to compare the effectiveness of individual customer service agents in order to determine which customer service agents result in high conversion, high sale amounts, or higher sale margins, and which customer service agents are less effective in the above metrics and/or other criteria, relative to the average effects of a customer-agent interaction.

At 136 the customer data stored at 130 is further evaluated in the aggregate in order to determine a conversion ratio for those products purchased with a customer-agent interaction. Such determination may be made by comparing each identified customer-agent interaction during an individual customer's visit with the point-of-sale data for that visit in order to identify a conversion ratio of the identified at least one subject product that was the subject of the customer-agent interaction. These determinations are exemplarily stored at a computer readable medium associated with the workforce management server.

At 138 a conversion ratio for those purchases made without a customer-agent interaction is determined. This determination can be made based upon the tracked customer locations throughout the customer visit in order to identify those locations and products associated with those locations wherein the customer stopped during the visit, but did not result in a purchase versus those locations where the customer stopped and a product was purchased according to the point-of-sale data.

By determining both the historical conversion ratio with customer-agent interactions and the determined conversion ratio without customer service interactions, the overall effectiveness of customer service interactions can be evaluated at 140. The effectiveness of the customer-agent interaction can be evaluated within a sales department within a retail store facility, or with respect to individual products, or across the facility as a whole. These evaluations made at 140 can further inform or guide management in making decisions regarding customer-agent interactions and whether more or less emphasis should be paced on interactions with regards to specific products, within specific departments, or across the retail store facility as a whole.

Figure 3:
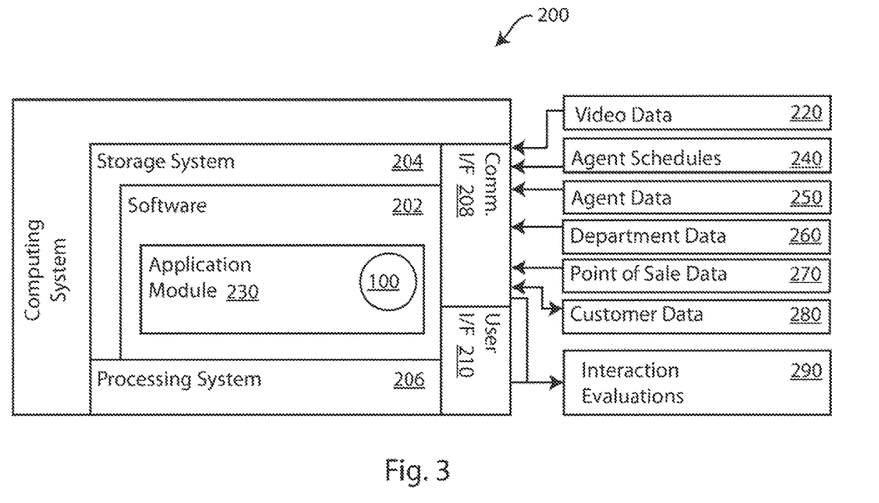
FIG. 3 is a system diagram of a computing system for monitoring customer interactions.

FIG. 3 is a system diagram of an exemplary embodiment of a computing system 200 for monitoring customer interactions. In exemplary embodiments, the computing system 200 may be used to implement embodiments of the workforce management server 16 and/or interaction computer 18 as exemplarily described above with respect to FIG. 1. The computing system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 100 as described above with respect to FIG. 2.

Although the computing system 200 as depicted in FIG. 3 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can include a microprocessor and other circuitry that retrieves and executes software 202 from storage system 204. Processing system 206 can be implemented within a single processing device but can also be distributed across multiple processing devices or sub-systems that cooperate in executing program instructions. Examples of processing system 206 include general purpose central processing units, application specific processors, and logic devices, as well as any other type of processing devices, combinations of processing devices, or variations thereof.

The storage system 204 can include any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable of communicating with the processing system 206.

Examples of storage media include random access memory, read only memory, magnetic discs, optical discs, flash memory, virtual and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. In embodiments, the user interface 210 operates to present and/or to receive information to/from a user of the computing system 200. Output devices such as a video display or graphical display can display an interface further associated with embodiments of the system and method as disclosed herein. Speakers, printers, haptic devices and other types of output devices may also be included in the user interface 210.

As described in further detail herein, the computing system 200 receives and transmits data through the communication interface 208. In embodiments, the communication interface 208 operates to send and/or receive data to/from other devices to which the computing system 200 is communicatively connected. In the computing system 200, video data 220 is received. The video data 220 may exemplarily conic directly from a plurality of video cameras as depicted in FIG. 1, while in other embodiments the video data 220 is exemplarily stored at a computer readable medium which may be remotely located form the computing system. In a still further embodiment, the video data 220 is received by the computing system 200 from an intermediate computer (not depicted) that performs initial video processing on the video data, exemplarily to identify people in the video data or provide an initial count of people in the video data. As described above, the computing system 200 also receives agent schedules 240, agent data 250, department data 260, and point of sale data 270 which is all exemplarily stored on one or more computer readable media. Further, as described in detail above, the computing system 200 receiving customer data 280, which is exemplarily the stored information pertaining to a particular tracked customer. It is also recognized that while the computing system 200 is operating to track and monitor a customer, the computing system 200 is operating to store the customer data 280 exemplarily on a computer readable medium. The computing system 200 executes the application module 230 exemplarily to carry out an embodiment of the method 100 as described herein.

The computing system 200 processes the video data 220 in order to identify, count, and/or track customers and agents in the video data 220. The computing system further receives agent schedules 240, agent data 250, department data 260, point of sale data 270, and customer data 280 and uses this information to determine interaction evaluations 290 as described above. The interaction evaluations 290 can be sent by the communication interface 208 to one or more remote computing devices, exemplarily one associated with a manager. The computing system 200 also may output the interaction evaluations 290 on a graphical display or other output device of the user interface 210. The interaction evaluations 290 may be used by a manager or other personnel to evaluate store operation and to exemplarily modify the department data.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram.

Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of monitoring customer service interactions, the method comprising:
    acquiring video data of a facility;
    automatedly processing the video data to identify all people in the video data as one of a customer and an agent;
    analyzing the video data to track a location of at least one customer in the facility;
    analyzing the video data to track a location of at least one agent in the facility;
    identifying an intersection of the respective tracked locations of the customer and the agent;
    based on the identified intersections, automatedly determining which intersections result in an interaction, wherein an interaction is determined based on a required pre-determined dwell time;
    determining a start and an end of the interaction based on an analysis of the video data;
    based on the determined start and end of the interaction, retrieving the video data for the interaction as interaction video data;
    analyzing the interaction video data to derive interaction data, wherein the interaction data includes identifying a product that is a subject of the interaction;
    tracking the location of the customer through a check out;
    associating the customer with point-of-sale data;
    evaluating an interaction effectiveness of the identified interaction based upon the point-of-sale data associated with the customer;
    storing the interaction data and the interaction effectiveness;
    evaluating an agent effectiveness of the agent based upon the evaluated interaction effectiveness of all interactions of the agent;
    analyzing point-of-sale data for products not associated with an interaction;
    analyzing point-of-sale data for products associated with an interaction;
    determining a conversion ratio for product sales not associated with an interaction;
    determining a conversion ratio for product sales associate with an interaction; and
    evaluating the effectiveness of the interactions based upon a comparison of the conversion ratios.

2. The method of claim 1, wherein an interaction is identified if a dwell time of the customer and agent at the intersection is greater than a predetermined time length.

3. The method of claim 1, wherein the product is identified from the analysis of the video data.

4. The method of claim 1, wherein the product is identified based upon a location of the intersection used to identify the interaction.

5. The method of claim 1, wherein the effectiveness of the identified interaction is evaluated based upon a comparison of the point-of-sale data associated with the customer to average point-of-sale data for the product that is the subject of the interaction.

6. The method of claim 1, further comprising:
    acquiring supplemental location data of at least one agent from an electronic device associated with the at least one agent;
    tracking the at least one agent location based upon the supplemental location data and the analyzed video data.

7. A method of monitoring customer service interactions, the method comprising:
    acquiring video data with a plurality of cameras;
    automatedly processing, with an interaction computer, the video data to identify all people in the video data as one of a customer and an agent;
    analyzing, with the interaction computer, the video data to identify a plurality of locations of a customer;
    analyzing, with the interaction computer, the video data to track a location of at least one agent;
    tracking the customer through the plurality of locations to a check out;
    identifying an intersection of the respective tracked locations of the customer and the agent;
    based on the identified intersections, automatedly determining which intersections result in an interaction, wherein an interaction is determined based on a required pre-determined dwell time;
    determining with the interaction computer a start time and an end time of the interaction, based on analysis of the video data;
    based on the determined start and end of the identified interaction, retrieving video data for the identified interaction as interaction video data;
    analyzing the interaction video data with the interaction computer to identify a product that is the subject of the identified interaction;
    associating the customer with point-of-sale data;
    analyzing point-of-sale data for products not associated with an interaction;
    analyzing point-of-sale data for products associated with an interaction;
    determining a conversion ratio for product sales not associated with an interaction;
    determining a conversion ratio for product sales associate with an interaction; and
    evaluating the effectiveness of the interactions based upon a comparison of the conversion ratios.

8. The method of claim 7, further comprising:
    receiving agent data from computing device associated with at least one agent at an agent tracking system; and
    processing the agent data with the agent tracking system to produce supplemental location data;
    wherein the interaction computer further uses the supplemental location data to track the location of at least one agent.

9. The method of claim 7, further comprising:
    identifying a product that is the subject of an identified interaction between the customer and at least one agent with the interaction computer based upon a location of the identified intersection; and
    evaluating the point-of-sale data with respect to the identified product to evaluate the identified at least one interaction.

10. The method of claim 7, further comprising:
    determining a conversion ratio for interactions of an agent;

evaluating the performance of the agent based upon the determined conversion ratio.

11. A non-transitory computer readable medium programmed with computer readable code that upon execution by a computer processor causes the computer processor to:
acquire video data;
automatedly process the video data to identify all people in the video data as one of a customer and an agent;
analyze the video data to identify a plurality of locations of a customer;
analyze the video data to track a location of at least one agent;
track the customer through the plurality of locations to a check out;
identify an intersection of the respective tracked locations of the customer and the agent;
based on the identified intersections, automatedly determine which intersections result in an interaction, wherein an interaction is determined based on a required pre-determined dwell time;
determine a start and an end of the interaction, based on analysis of the video data;
based on the determined start and end of the interaction, retrieve the video data for the interaction as interaction video data;
analyzing the interaction video data to derive interaction data;
identify at least one product associated with the interaction;
associate the customer with point-of-sale data;
evaluate an interaction effectiveness of the identified at least one interaction based upon the point-of-sale data and the at least one product;
store the interaction data and the interaction effectiveness;
evaluate an agent effectiveness of the agent of the identified at least one interaction based upon the evaluated interaction effectiveness of all interaction of the agent;
analyze point-of-sale data for products not associated with an interaction;
analyze point-of-sale data for products associated with an interaction;
determine a conversion ratio for product sales not associated with an interaction;
determine a conversion ratio for product sales associate with an interaction; and
evaluate the effectiveness of the interactions based upon a comparison of the conversion ratios.

12. The non-transitory computer readable medium of claim 11, wherein execution of the computer readable code further causes the computer processor to:
identify at least one agent in the video data, wherein the location of the identified at least one agent is tracked;
access a schedule of the at least one agent, wherein the schedule is further used to identify and track the location of the at least one agent; and
access department data, wherein the department data is further used to identify and track the location of the at least one agent.

* * * * *